Feb. 2, 1960

J. J. FANNEN 2,923,527

TIRE SPREADER

Filed July 2, 1956

INVENTOR.
John J. Fannen
BY
ATTYS

Feb. 2, 1960 J. J. FANNEN 2,923,527
TIRE SPREADER
Filed July 2, 1956 6 Sheets-Sheet 3

INVENTOR.
John J. Fannen
BY
ATTYS

Feb. 2, 1960

J. J. FANNEN 2,923,527

TIRE SPREADER

Filed July 2, 1956

INVENTOR.
John J. Fannen
BY
*[signature]*
ATTYS

Feb. 2, 1960   J. J. FANNEN   2,923,527
TIRE SPREADER
Filed July 2, 1956   6 Sheets-Sheet 6
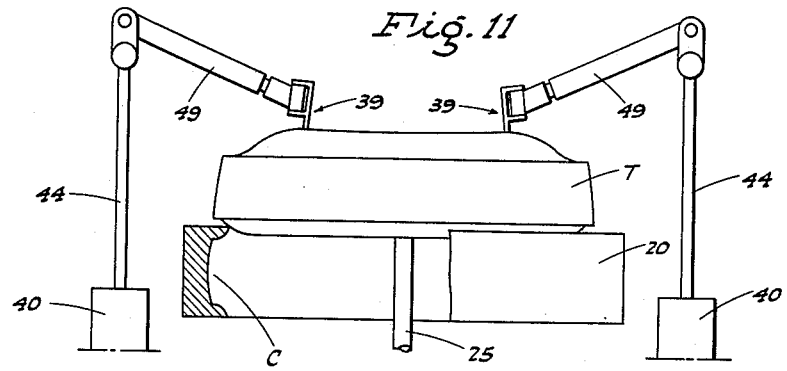
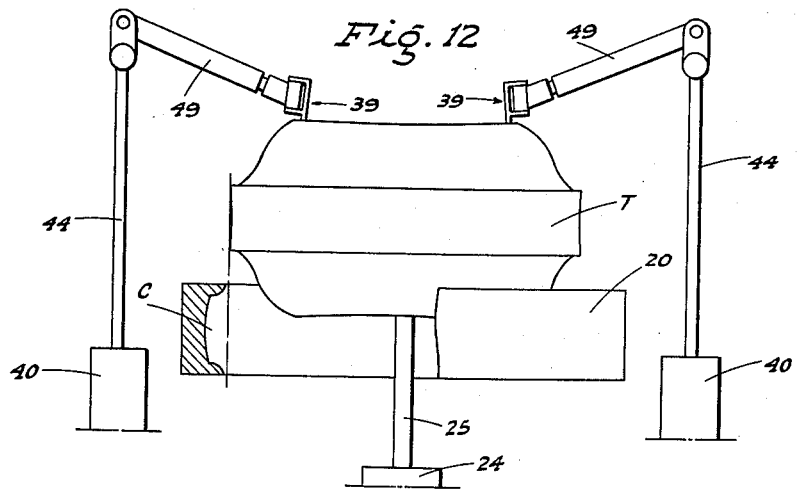
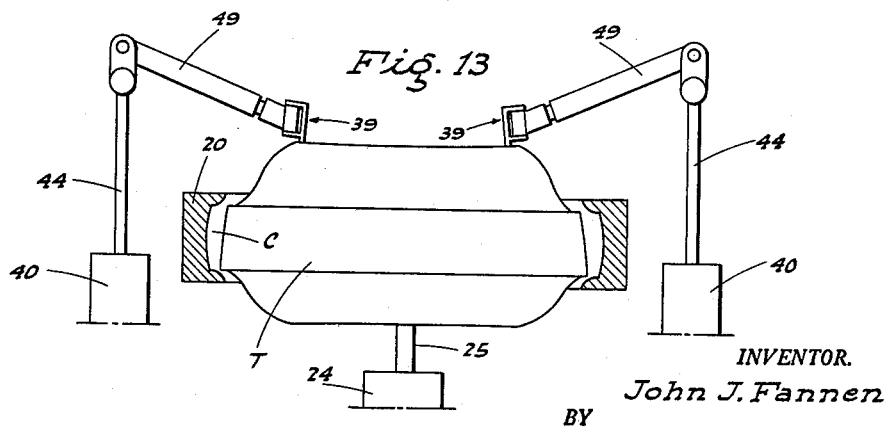
INVENTOR.
John J. Fannen
BY
ATTYS United States Patent Office 2,923,527
Patented Feb. 2, 1960

2,923,527

TIRE SPREADER

John J. Fannen, Lodi, Calif., assignor to Super Mold Corporation of California, Lodi, Calif., a corporation of California Application July 2, 1956, Serial No. 595,370

7 Claims. (Cl. 254—50.3)

In the tire retreading industry, the retreading of tires is performed—by one method—in a portable, self-contained, full-circle or band-type mold which includes an endless, inwardly opening tire receiving matrix cavity; such a mold being shown in copending application, Serial No. 591,974, filed June 18, 1956.

In order insert a tire, having the unvulcanized new tread rubber or camelback thereon, in a mold of the above type, preparatory to the vulcanizing operation, and to subsequently remove the tire after such operation is complete, it is necessary to substantially reduce the outside diameter of the tire, and this is accomplished in a device known as a "tire spreader."

The function of a tire spreader is to engage and spread the beads of a tire apart in an axial direction, which results in such reduction in the tire diameter, and to then hold the tire in such condition while inserting it in—or removing the same from—the mold.

It is therefore a major object of the present invention to provide a power actuated tire spreader, for use with a band-type tire retreading mold, which is of novel construction and function; the spreader being designed to readily receive and hold the mold in place, and to thereafter spread the tire beads apart so that the tire—by reason of the resultant reduction in outside diamter—can be positively and smoothly inserted in, or removed from, such mold.

Another object of the invention is to provide a tire spreader, as above, which includes opposed bead engaging and spreading units which are of novel form, and independently actuated to attain a nicety of control during the spreading of the beads of the tire to reduce its outside diameter, and the subsequent movement of such tire by said units either into or out of the mold.

An additional object of the invention is to provide a tire spreader which embodies an effective, manually operated, quick-acting mechanism for securing the mold on the spreader in an accurately centered position relative to the bead engaging and spreading units; one of such units also being arranged with means to initially locate the tire in centered relation to the mold as so secured on the spreader by said mechanism; all to the end that when the spreader is in use, the tire and mold are co-axial, and which is necessary to the attainment of easy and unobstructed movement of the reduced-diameter tire into or out of such mold.

It is also an object of the invention to provide a tire spreader which is designed for convenient use and ready control by the operator.

Still another object of the invention is to provide a practical, reliable, and durable tire spreader, and one which will be exceedingly effective for the purpose for which it is designed.

These objects are accomplished by means of such structure and relative arrangement of parts as will fully appear by a perusal of the following specification and claims.

Figure 1:
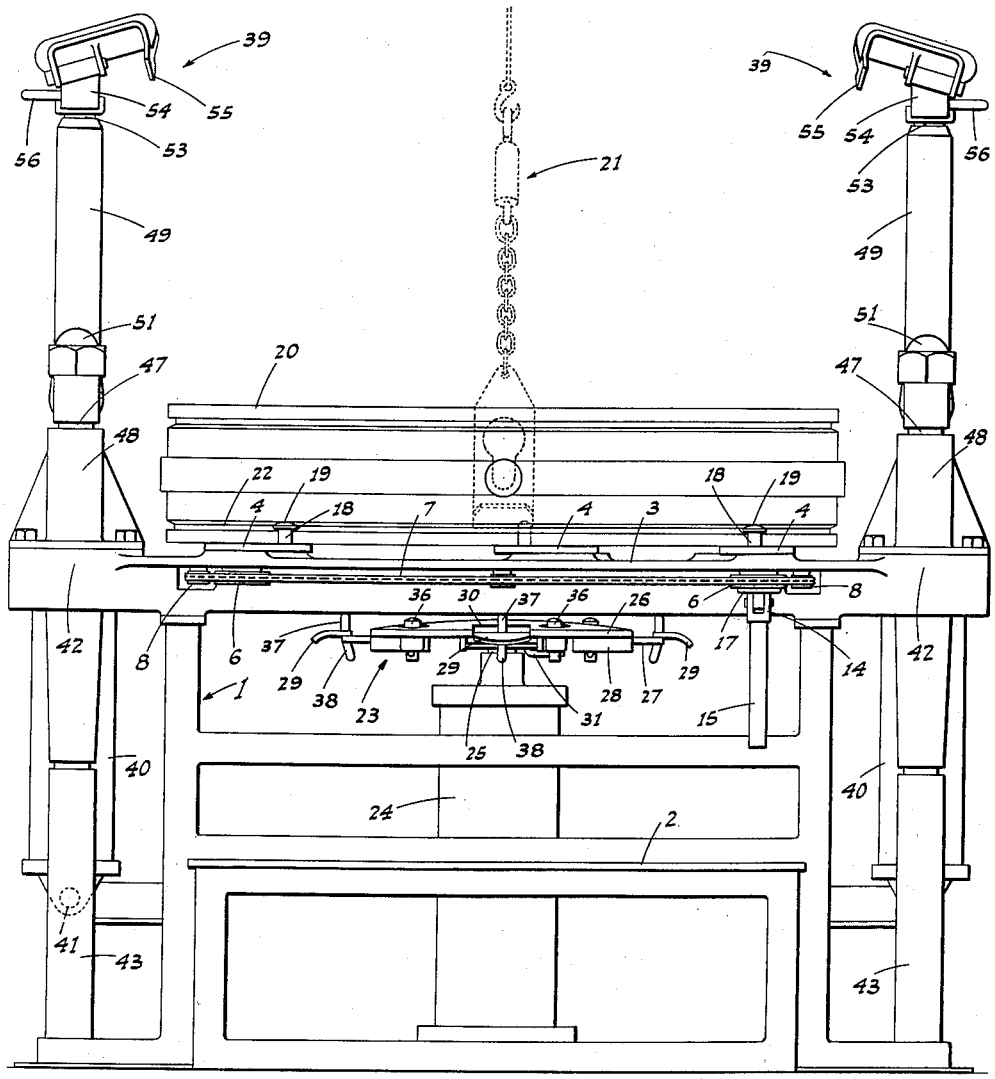
Fig. 1 is a front elevation of the tire spreader showing the mold as initially lowered into place thereon.
Figure 2:
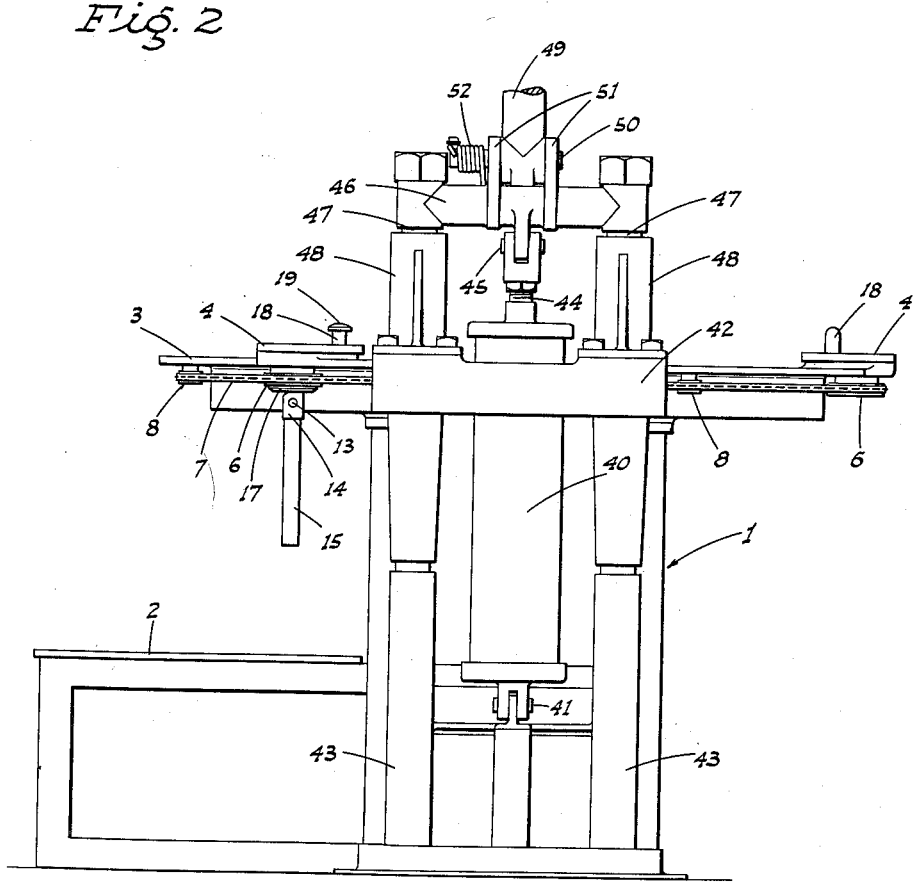
Fig. 2 is a side elevation of the tire spreader.

Figs. 8–13 inclusive are diagrammatic views illustrating the sequential steps in the operation of the tire spreader to insert a tire in the spreader-supported mold.

Referring now more particularly to the drawings, and to the characters of reference marked thereon, the tire spreader comprises a rigid, upstanding frame, indicated generally at 1, and which frame is of open or skeleton construction; there being a raised foot platform 2 which extends forwardly from the frame 1.

In a plane above the foot platform 2, and at the top of the frame 1, the latter supports—in rigid relation—a horizontal platform ring 3 of substantial diameter, and which is symmetrically disposed—in plan—relative to such frame.

At circumferentially spaced points, and adjacent the periphery thereof, the horizontal platform ring 3 is fitted—on top thereof—with eccentric rotary plates 4 suitably journaled in connection with said ring, and each having a depending stub shaft 5 fitted—below said ring—with a sprocket 6.

An endless chain 7 is disposed below the platform ring 3 and is trained about each of the sprockets 6; such chain—intermediate the sprockets 6—turning about idler sprockets 8 likewise carried by said ring on the under side.

Figure 7:
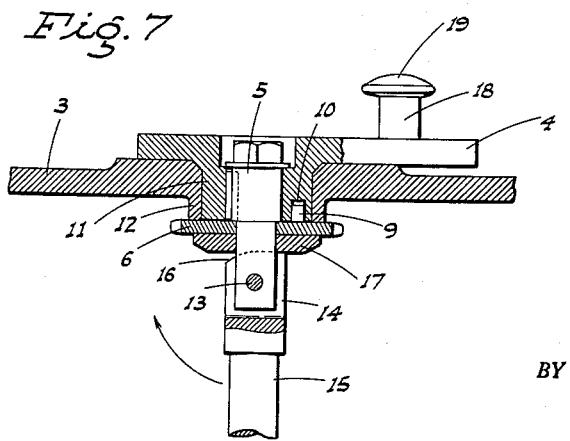
Fig. 7 is an enlarged fragmentary section taken on line 7—7 of Fig. 4.

In order to reversibly actuate the endless chain 7—for the purpose of simultaneously rotating the eccentric plates 4—the following arrangement is employed in connection with the depending stub shaft 5 of one of the rotary plates 4 at the front of the device, and which arrangement is shown in detail in Fig. 7. Here the depending stub shaft 5—which on all others is rigidly fixed to the sprocket—projects through the related one thereof in axially slidable relation, and extends to a lower end termination therebelow. This particular sprocket includes an upstanding pin 9 which slidably engages in a downwardly opening bore 10 in the hub 11 of the related eccentric rotary plate 4, and in which hub the stub shaft 5 is slidably splined, as shown; such hub being carried in a depending boss 12.

At its lower end the depending stub shaft 5 of the arrangement shown in Fig. 7 is secured by a pivot pin 13 in a clevis 14 on the upper end of a normally dependent handle 15; the upper end of such handle being formed with a cam 16.

When the handle 15 is in its normal dependent position, the cam 16 works against a washer 17 which encircles the depending stub shaft 5 between said cam 16 and the sprocket 6, then clamping the latter against the lower end of the boss 12, which thus prevents any motion of the endless chain 7.

The eccentric plates 4 are each fitted—in offset relation to the axis of rotation—with an upstanding pin 18, and at their upper ends certain of said pins are formed with enlarged heads 19.

At the outset the eccentric plates 4 are disposed so that the upstanding pins 18 lie in a circumferential path whose diameter is greater than the outside diameter of the band-type mold, indicated generally at 20, with which the tire spreader is adapted to be used.

Such band-type mold 20 is secured on the tire spreader—for insertion of a tire into such mold, or subsequent removal of such tire—in the following manner:

The mold 20 is lifted by a hoist, indicated in part at 21, and is disposed horizontally—and in substantially coaxial relation—above the platform ring 3. The mold is then lowered until it rests on the eccentric rotary plates 4 inwardly of the upstanding pins 18.

Figure 3:
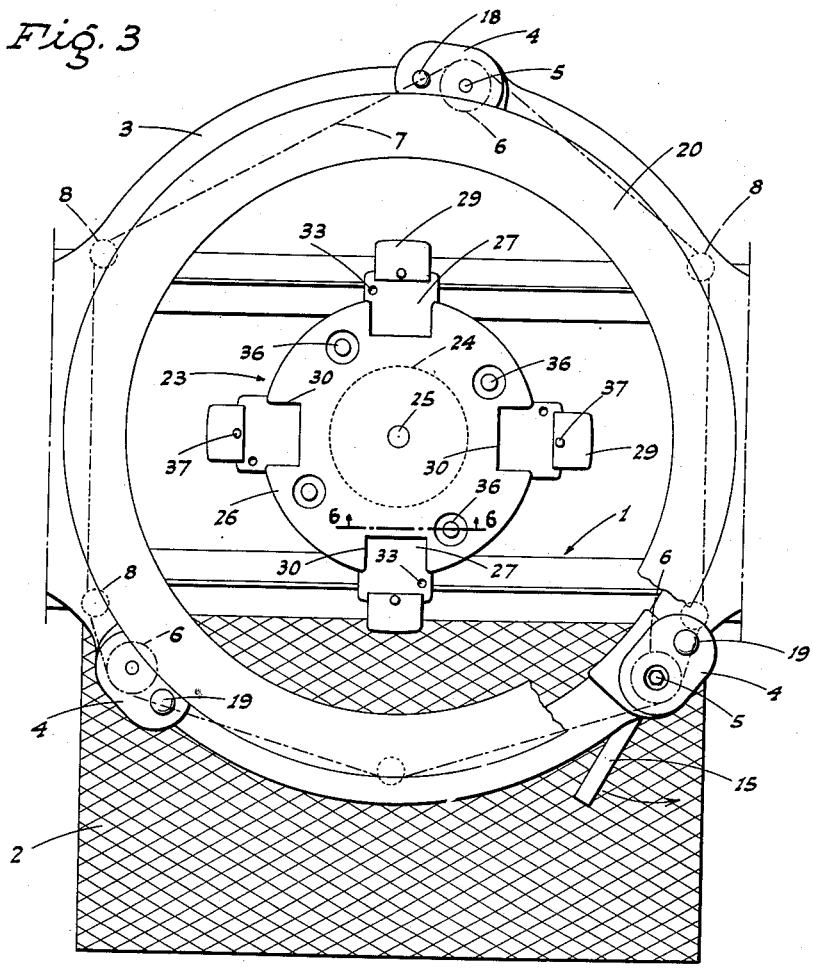
Fig. 3 is a fragmentary top view showing the mold on the tire spreader and prior to said mold being secured in place; the slides of the lower bead engaging and spreading unit being shown extended.
Figure 5:
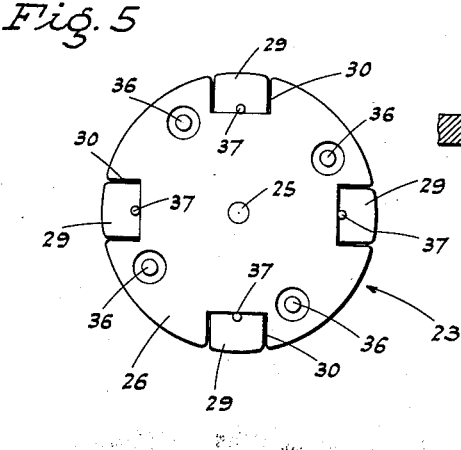
Fig. 5 is a plan view of the lower bead engaging and spreading unit detached and with the slides retracted.
Figure 6:
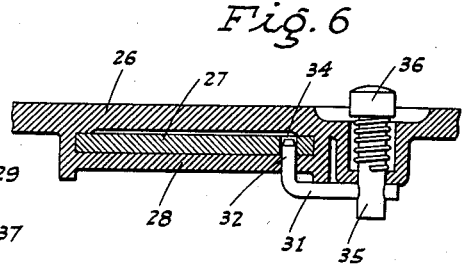
Fig. 6 is an enlarged fragmentary section taken on line 6—6 of Fig. 3.

Nextly, the normally depending handle 15 is grasped by the operator standing on the foot platform 2, and such handle is swung upwardly and outwardly to a substantially horizontal position, as shown in Fig. 3. This results in release of the clamping washer 17, and the operator then swings such handle 15 in a manner to impart motion to the endless chain 7 in a direction to rotate all of the sprockets 6 and the plates 4 to simultaneously cause the pins 18 to move inwardly into engagement with the periphery of the mold 20, which effectively centers the latter in the spreader.

The mold 20 is formed with a peripheral groove 22, and when the upstanding pins 18 are moved inwardly, as above, the heads 19 engage in such groove 22 to prevent any vertical displacement of the mold from the eccentric rotary plates 4 during use of the tire spreader.

The lower bead engaging and spreading unit, of the tire spreader, is indicated generally at 23, and comprises the following:

A fluid pressure actuated power cylinder 24 is fixed at its lower end to the bottom of the frame 1, and such power cylinder upstands below the platform ring 3 in a position coaxially related thereto.

A piston rod 25 extends from the upper end of the cylinder 24 and is centrally fixed to a horizontal disc 26 whose outside diameter is lesser than the inside diameter of any tire with which the spreader is adapted to be used.

The horizontal disc 26 is fitted, at circumferentially spaced points (here 90 degrees apart) with flat radial slides 27 carried in guideways 28 formed on the under side of said disc. At the outer end each radial slide 27 is fitted with a rigid, outwardly projecting, bead engaging pad 29; said pads being received in notches 30 in the periphery of the disc 26 when said slides 27 are in a retracted position.

The slides 27 are each releasably latched—in a retracted or advanced position—by means of a dog leg catch pin 31 having an upturned end portion 32 which slidably extends through the bottom of the related guideway 28, releasably engaging in an outer bore 33 or an inner bore 34 when the slide 27 is retracted or advanced, respectively.

The dog leg catch pin 31 is fixed to the lower end of a depressible, spring-returned plunger 35 mounted in connection with the disc 26 to one side of the related slide 27, and which plunger is formed—on its upper end—with a finger knob 36 manually accessible from above said disc. By merely depressing the knob 36 the related slide 27 may be released, advanced or retracted, and thereafter relatched in position by merely releasing said knob 36. The bead engaging pad 29 of each slide 27 is provided with an upstanding pin 37, and a depending pin 38; these pins acting as stops and tire centering elements, as will be seen.

At the start of each tire spreading operation the piston rod 25 and disc 26 are in lowered position, with the radial slides 27 retracted; the lower bead engaging and spreading unit 23 functioning—during a tire spreading operation—in the manner as will hereinafter appear.

The upper bead engaging and spreading unit is comprised of separate, initially upstanding, swing arm and bead engaging hook assemblies, each being indicated generally at 39; there being one of said assemblies mounted at each side of the tire spreader and laterally outwardly of the spreader-supported mold 20. As the swing arm and bead engaging hook assemblies 39 are of like construction—excepting being positionally opposed—a description of one will suffice for both.

Each swing arm and bead engaging hook assembly 39 comprises an upstanding fluid pressure actuated power cylinder 40 pivotally connected at its lower end, as at 41, in the frame 1, and thence extending upwardly—in clearance relation—through a laterally outwardly projecting extension 42 on the platform ring 3; each such extension 42—which extends horizontally front to rear of the frame 1—being supported, at the ends and from below, by posts 43 which extend upwardly from the bottom of said frame 1.

The power cylinder 40 includes an upwardly projecting piston rod 44 pivotally connected, as at 45, to a cross head 46 centrally of the ends of the latter.

At its ends the cross head 46 is fitted with downwardly extending slide rods 47, which work in vertical guide sleeves 48 mounted on—and upstanding from—the ends of the related, laterally outwardly projecting extension 42.

A tubular swing arm 49, which is initially disposed in a vertical position, is pivoted—at its lower end, as at 50—between transversely spaced ears 51 which extend upwardly from the central portion of the cross head 46. The pivot pin 50 is extended at one end beyond the corresponding ear 51, and a balancing spring 52 of torsion type surrounds the projecting end portion of pin 50; the spring being anchored at one end to the pin, and at the other end to the cross head 46.

The pivot pin 50—which is fixed to the lower end of the related swing arm 49—acts to yieldably maintain the latter in its initial vertical position, and counterbalances the weight of such arm as it is manually swung—as will hereinafter appear—from such vertical position downwardly to an inwardly projecting position.

Figure 4:
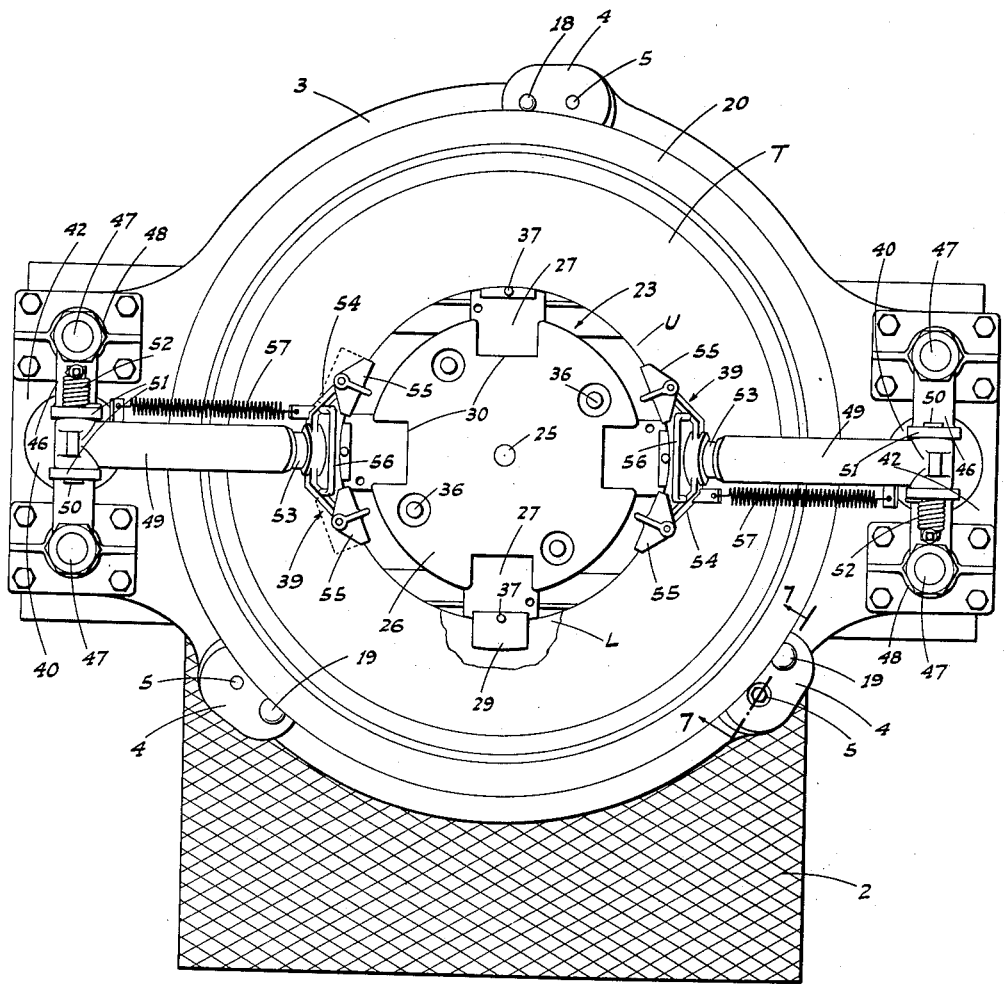
Fig. 4 is a top plan view of the tire spreader showing both the upper and lower bead engaging and spreading units in working positions preparatory to axially separating the tire beads.

A rod 53 is included with and slidably and turnably engages in the swing arm 49 from the outer end of the latter, and said rod 53—at its outer end—is fitted with a transverse, normally substantially horizontal carrier 54, and the latter—at its outer ends—is fitted with pivotally attached, bead engaging hooks 55; the pivotal mount of said hooks being such that they are swingable about a generally upstanding axis when the swing arms 49 are in their lowered, inwardly projecting position, as shown—for example—in Fig. 4.

The carrier 54 is fitted—at the back, and centrally of its ends—with a handle 56, by means of which the corresponding swing arm and bead engaging hook assembly 39 may be manipulated by the operator standing on the foot platform 2.

The slide rod 53 is initially but yieldably urged substantially full length into the tubular swing arm 49 by a pull-back or tension spring 57 connected between the carrier 54 and said swing arm 49 at a point adjacent the inner end of the latter; such spring lying relatively close—and parallel—to said swing arm.

Figure 8:
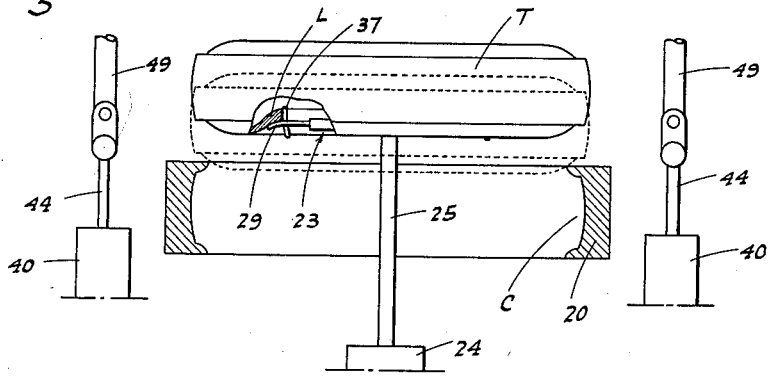

With a band-type mold 20 secured horizontally in the tire spreader in the manner previously described, with the lower bead engaging and spreading unit 23 in its lowered position, and with the swing arm and bead engaging hook assemblies 39 in their upstanding or raised position, the device is used in the following manner to insert a tire in said mold:

Particularly by reference to Figs. 8–13 inclusive, which illustrate diagrammatically the sequential steps, a tire T is first laid at rest—as shown in dotted lines in Fig. 8—atop the mold 20; such tire—with the new tread rubber or camelback thereon—then being of too great an outside diameter for insertion into the mold 20, and particularly into the tire receiving matrix cavity C thereof.

Thus, to insert the tire T into such matrix cavity C of the mold 20 it is necessary to reduce the tire in its outside diameter to a substantial extent, and to then move the tire axially into such mold.

To accomplish this the slides 27 on the disc 26 of the lower bead engaging spreading unit 23 are first advanced so that said slides and the bead engaging pads 29 project outwardly from the periphery of the disc.

This is followed by raising of the disc 26 by the power cylinder 24 until the bead engaging pads 29 rest against the lower bead L from the under side; the disc 26 being raised until the tire T is lifted clear of the mold 20.

Thereafter, the tire is manipulated so that the upstanding pins 37 accurately center the tire relative to the mold 20; all as shown in Fig. 8.

Thereafter, the disc 26 is lowered by the power cylinder 24, which results in the tire T being returned to its seat on top of the mold 20, now accurately centered relative to the latter.

This is followed by the disc 26 being further lowered to clear such tire, whereupon the slides 27 and pads 29 are returned to their retracted position.

Figure 9:
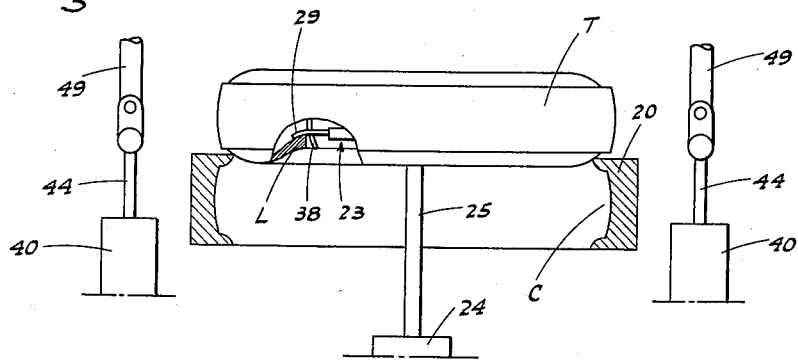

Nextly, the disc 26 is again run upwardly until it occupies a position in a plane intermediate the lower bead L and the upper bead U of the tire T, and in such position of the disc the slides 27 and pads 29 thereon are again advanced, which disposes said pads in overlying relation to the lower bead L; the disc then being slightly lowered until the pads 29 engage—and impose a slight downward pressure on—said lower bead L (see Fig. 9). The depending pins 38 prevent any undesirable displacement of the tire T radially of the disc 26.

Nextly, the operator grasps the handles 56 of the swing arm and bead engaging hook assemblies 39 and swings both thereof downwardly to a laterally inwardly projecting position.

Figure 10:
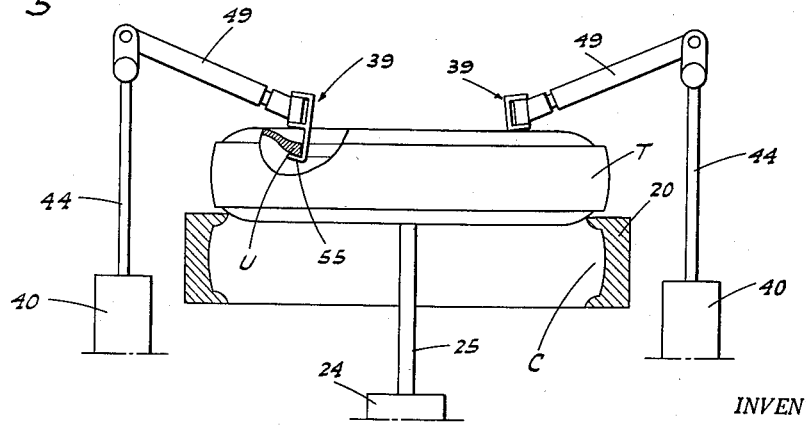

Thereafter—by pulling on said handles— the rods 53 are partially slid out of the arms 49, and to such an extent that the hooks 55 may then be engaged with the upper bead U—from below—of the tire, whereupon the handles are released; the springs 57 then retracting the rods 53 sufficient to maintain such engagement (see Fig. 10).

This is followed by the power cylinders 40 being simultaneously operated to raise both of the swing arm and bead engaging hook assemblies, which in turn pulls the upper bead U of the tire upwardly a substantial distance (see Fig. 11).

Nextly, the disc 26—which remained stationary during raising of the assemblies 39—is moved downwardly by the power cylinder 24, and with such downward movement the pads 29—then in engagement with the lower bead L from above—move such latter bead downwardly a distance comparable to that which the upper bead U was theretofore moved upwardly.

With such relatively wide axial separation of the beads L and U of the tire T, it is distorted in the manner shown in Fig. 12, and which results in a substantial reduction in the cover-all diameter of such tire.

With the diameter of the tire T so reduced, the power cylinders 24 and 40 are operated to simultaneously lower the tire T into the mold 20, and until the tread of the tire is in proper position for reception in the matrix cavity C, whereupon the movement is stopped.

Thereafter, the disc 26 is raised slightly by the power cylinder 24, with resultant raising of the lower bead L sufficient that the tire T begins to expand into the matrix cavity C (see Fig. 13); this latter motion of the disc 26 being stopped before the lower bead L reaches its normal position.

Nextly, the operator—standing on the platform 2—inserts an inside curing bag and an inside curing rim in the tire from above; such bag and rim not being shown.

After insertion of the inside curing bag and inside curing rim in the tire, the power cylinders 24 and 40 are operated in a manner to raise the disc 26 and lower the assemblies 39 until the beads L and U return to their normal position, and at which time the tire fully expands into the matrix cavity C.

As final steps the slides 27 are retracted, and the disc is lowered to its starting position, while the swing arms 49 are manipulated by the handles 56 to release the hooks 55, which is followed by manual swinging of said assemblies 39 to their vertical position.

The mold 20, with the tire T thus inserted therein, is then released from the tire spreader by suitable simultaneous operation of the rotary plates 4, whereupon such mold is picked up by the hoist 21 and moved to a suitable position clear of the tire spreader, and in which position the vulcanizing operation is conducted; the heating of the mold and the vulcanizing operation being more specifically described in the identified copending application, Serial No. 591,974, filed June 18, 1956.

After the vulcanizing operation is complete, the mold 20 is returned to the spreader, and the same is used—but in reverse order of the sequential steps—to remove the tire from the mold.

With the described tire spreader a tire may be inserted in—or removed from—the mold 20 in an effective and expeditious manner; all being accomplished by very simple manipulations on the part of the operator.

While not here shown—and omitted for the sake of clarity—the power cylinder 24 and the power cylinders 40 are operated through the medium of a valve-regulated, fluid pressure conduit system, and by means of which the cylinder 24 can be worked independently of—or simultaneously with—the cylinders 40, selectively, all of said cylinders being of double-acting type.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A tire spreader comprising, with a frame having means thereon to support a tire to be spread in a horizontal position so as to then have upper and lower beads, a lower spreader unit mounted in connection with the frame below said means and including elements to engage the lower bead; and an upper spreader unit comprising upstanding vertically movable rods mounted in connection with the frame on opposite sides of the tire, a swing arm mounted on the upper end of each rod in position to overhang the adjacent side of the tire, and a hook assembly on the outer end of the arm to engage the upper bead of the tire on the inside thereof; said swing arm being telescopic whereby the operative length thereof may be extended or contracted, and spring means connected to the arm and yieldably resisting extension thereof.

2. A tire spreader comprising, with a frame having means thereon to support a tire to be spread in a horizontal position so as to then have upper and lower beads, a lower spreader unit mounted in connection with the frame below said means and including elements to engage the lower bead; and an upper spreader unit comprising upstanding vertically movable rods mounted in connection with the frame on opposite sides of the tire, a swing arm mounted on the upper end of each rod in position to overhang the adjacent side of the tire, and a hook assembly on the outer end of the arm to engage the upper bead of the tire on the inside thereof; said swing arm comprising a main portion and a rod slidable in and projecting from the outer end of the main portion and on which rod the hook assembly is mounted, and a spring connected between said main portion of the arm and said rod and yieldably resisting extension of the latter.

3. A tire spreader comprising, with a frame having means thereon to support a tire to be spread in a horizontal position so as to then have upper and lower beads, a lower spreader unit mounted in connection with the frame below said means and including elements to engage the lower bead; and an upper spreader unit comprising upstanding vertically movable rods mounted in connection with the frame on opposite sides of the tire, a swing arm mounted on the upper end of each rod in position to overhang the adjacent side of the tire, a hook assembly on the outer end of the arm to engage the upper bead of the tire on the inside thereof, a cross head on the upper end of the rod, a horizontal pivot pin extending lengthwise of and mounted on the cross head and on which the inner end of the swing arm is mounted, and spring means acting to swing the arm upwardly and yieldably resisting downward movement of the same about the pin as an axis in the direction of the tire.

4. A tire spreader comprising, with a frame having means thereon to support a tire to be spread in a horizontal position so as to then have upper and lower beads, a lower spreader unit mounted in connection with the frame below said means and including elements to engage the lower bead; and an upper spreader unit comprising upstanding vertically movable rods mounted in connection with the frame on opposite sides of the tire, power means applied to each rod to raise and lower the same, a cross head on the upper end of each rod, a swing arm mounted at its inner end on the cross head in position to overhang the adjacent side of the tire, a hook assembly on the outer end of the arm to engage the upper bead of the tire on the inside thereof, guide rods depending from the cross head adjacent its ends, and sleeves mounted on the frame and in which the guide rods are slidable.

5. A tire spreader comprising, with a frame having means thereon to support a tire to be spread in a horizontal position so as to then have upper and lower beads, an upper spreader unit including opposed arms overhanging the tire from the outside and bead engaging elements on the outer end of the arms; and a lower bead spreading unit comprising a disc, a rod depending from the disc, a power cylinder fixed with the frame and in which the rod is slidable, slides mounted in the disc for movement radially thereof, pads on the outer ends of the slides adapted for engagement with the lower tire bead when the slides are advanced, releasable catch means holding the slides in a predetermined position of advance, and a stop depending from each pad to engage the base of the bead when the slide is so advanced.

6. A spreader, as in claim 5, with another stop projecting upwardly from each pad in substantial vertical alinement with the first named stop.

7. A tire spreader comprising a frame, a horizontal annular member on the frame to support a tire to be spread in a horizontal position so as to then have upper and lower beads, an upper spreader unit to engage the upper bead, a lower spread unit mounted on the frame radially inward of and initially below a tire on said member, said lower unit including pads movable radially out to engage the lower tire bead and a vertically movable support for the pads, means to move the support upwardly from an initially lowered position whereby the pads may engage under the lower tire bead and lift the tire off said member, and elements upstanding from the pads to engage the base of said lower bead and center the tire relative to the member upon the tire being so lifted.

References Cited in the file of this patent

UNITED STATES PATENTS

| | | |
|---|---|---|
| 1,288,733 | Stevens | Dec. 24, 1918 |
| 1,466,009 | Weidaw | Aug. 28, 1923 |
| 1,908,311 | Branick | May 9, 1933 |
| 2,438,952 | Grotenhuis | Apr. 6, 1948 |
| 2,445,701 | Vogt | July 20, 1948 |
| 2,451,097 | Kraft | Oct. 12, 1948 |
| 2,631,817 | Trunnell | Mar. 17, 1953 |
| 2,665,883 | Glynn | Jan. 12, 1954 |

FOREIGN PATENTS

| | | |
|---|---|---|
| 15,630 | Australia | Sept. 14, 1928 |